W. R. PINCKNEY.
COTTON SEED CUTTER.
APPLICATION FILED JULY 3, 1920.
1,355,777.
Patented Oct. 12, 1920.
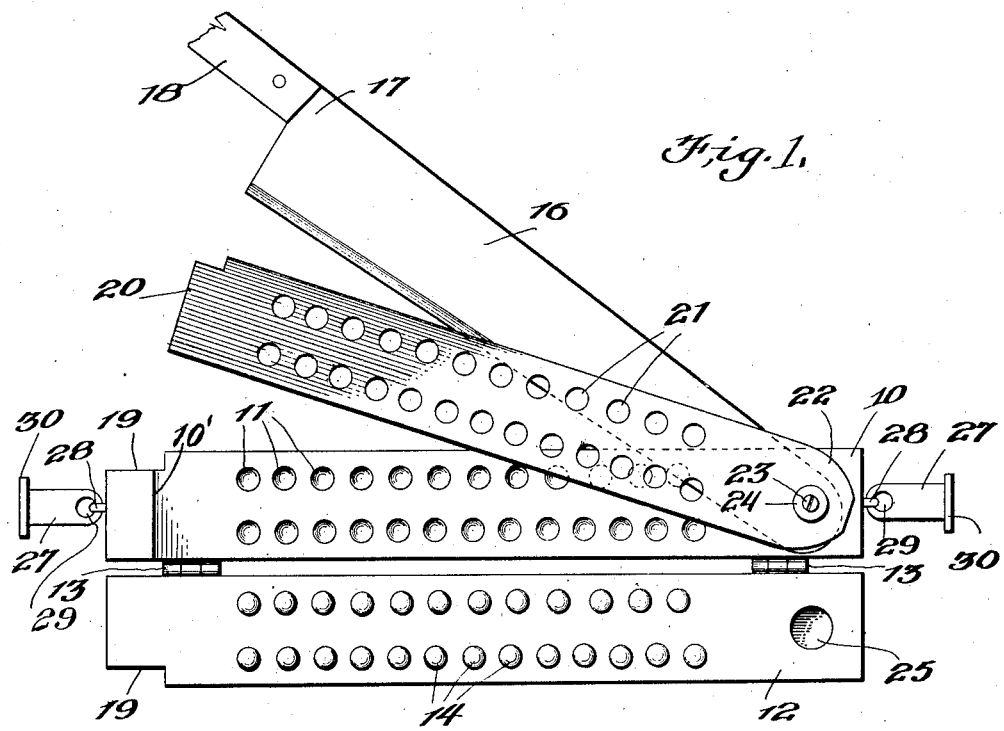
Fig. 1.
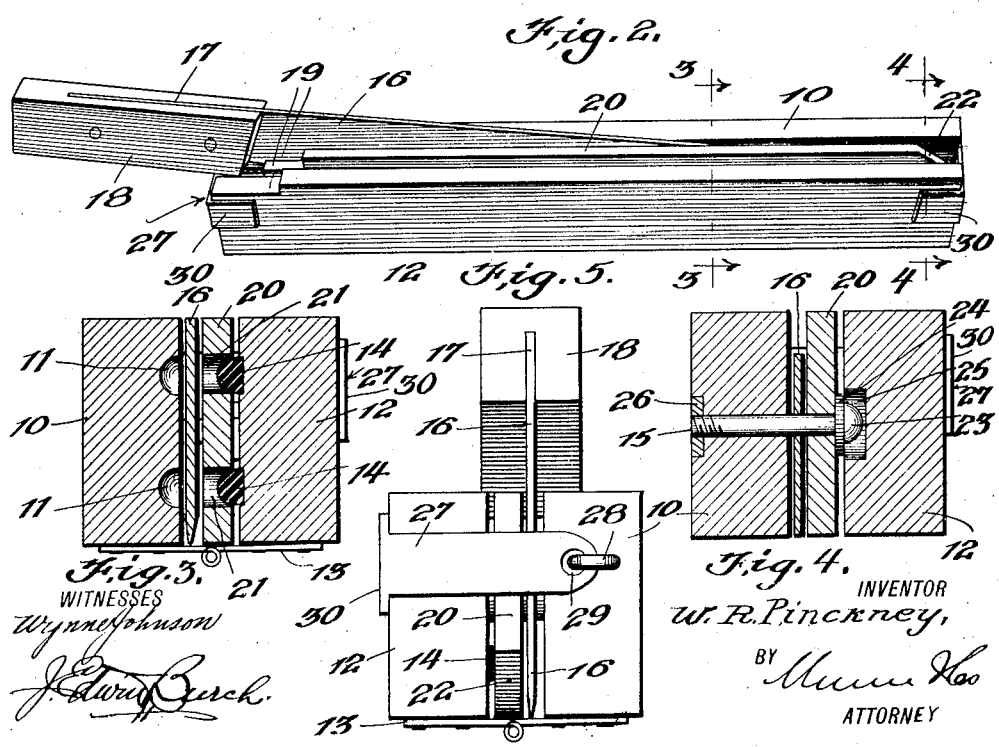
Fig. 2.
Fig. 3.
Fig. 5.
Fig. 4.
WITNESSES
Wynne Johnson
J. Edwin Burch.
INVENTOR
W. R. Pinckney,
BY
ATTORNEY

UNITED STATES PATENT OFFICE.

WILLIAM RICHMOND PINCKNEY, OF LITTLE ROCK, ARKANSAS.

COTTON-SEED CUTTER.

1,355,777.   Specification of Letters Patent.   Patented Oct. 12, 1920.

Application filed July 3, 1920. Serial No. 393,940.

*To all whom it may concern:*

Be it known that I, WILLIAM RICHMOND PINCKNEY, a citizen of the United States, and a resident of Little Rock, in the county of Pulaski and State of Arkansas, have invented certain new and useful Improvements in Cotton-Seed Cutters, of which the following is a specification.

This invention relates to an improved appliance or implement for cutting cotton seeds and the like for the purpose of grading and testing the same in order to determine the quality and market value of the seed, the prices quoted being based on whether or not the seeds are damaged and are prime or ripe.

According to the present method employed by cotton seed buyers, graders, oil mills and ginners, all cotton seed is now bought on grade, and the present method of arriving at the quality is very cumbersome and crude, in that, after drawing a sample of twenty-five pounds of cotton seed, one hundred seeds are cut open and the meats examined to determine if they have been damaged or are prime.

The seeds are cut one at a time, generally with a pocket knife, and this method consumes a great deal of time and energy. With the device constituting the subject matter of the present invention twenty-five seeds can be opened at one operation and the meats exposed for examination, thus shortening the time required for the grading of any given lot of seed by one half. Of course, it is to be understood that the size and capacity of the device can be varied and that it may be made to accommodate one hundred seeds so that the cutting operation can be effected with one stroke of the same.

The present invention is therefore designed to overcome the present defects and objections to the present method of cutting the seed and to construct the cutter in a simple manner which facilitates its operation and permits it to be economically produced, in addition to obviating the possibility of the seeds being pulled from the base holes of the device owing to the presence of lint on the seeds and the tendency thereof to adhere to the relatively movable parts of the device.

Other and further objects of my invention will become readily apparent to persons skilled in the art, from a consideration of the following description when taken in conjunction with the accompanying drawings, wherein:

Figure 1 is an elevation of the device with the parts in open positions,

Fig. 2 is a perspective view of the improved cotton seed cutter,

Fig. 3 is a sectional view transversely on the line 3—3 of Fig. 2,

Fig. 4 is a similar view taken on the line 4—4 of Fig. 2, and

Fig. 5 is an enlarged end elevation of the device looking toward the pivoted end of the blade.

Referring to the drawings in detail, in which like reference characters designate corresponding parts throughout the several views, my improved cotton seed cutter is shown as comprising a plurality of hinged and pivotal or relatively movable sections including a base 10 of rectilinear formation and preferably made of a strip of wood or the like of suitable thickness and rectangular outline and cross section having arranged thereon in rows in staggered or other relation, a plurality of cells formed by semi-circular holes or semi-spherical depressions in the inner face of the base as indicated at 11, these depressions being sufficiently large to accommodate the seeds therein, being preferably from about $\frac{3}{16}$ of an inch to $\frac{1}{4}$ inch deep by $\frac{3}{8}$ inch in diameter. Of course it is to be understood that any number of such depressions are provided according to the size and capacity of the device, but in the drawings I have illustrated twenty-five of such depressions.

Hinged to one longitudinal edge of the base 10 is a second section or cap 12 similar in construction to the base, the hinges thereof indicated at 13 being so arranged as to permit the base and cap to be spaced apart in parallel relation when the device is closed, as distinguished from the open position when the base and cap are arranged in alinement as particularly indicated in Fig. 1 of the drawings with the faces thereof exposed. The face of the cap 12 opposing the corresponding face or inner side of the base 10 is provided with a plurality of projecting resilient or cushioning members 14 in the form of rubber tips to facilitate attachment, although they may be substituted by springs sufficient to give the necessary resilient pressure to the seeds as will be later described. These resilient projections are designed to coöperate with the depressions 11, being arranged in the same relation so as to aline therewith when the sections constituted by the base and cap are moved toward each other.

Pivoted to the inner or active face of the base section at one end, through the medium of a transverse pivot or bolt 15 is a knife or blade 16, the pivoted end thereof being rounded and apertured for this purpose and the bolt serving as means for adjusting the tension of the blade against the face of the base and for securely retaining the same in position for pivotal movement in a plane parallel to the base and snugly in contact with the face thereof having the depressions 11. The blade 16 is preferably tapered toward its free end, and provided with a shank extension 17 to which a handle 18 is secured in order to manipulate the blade of the cutter, while the edges of the base and cap are preferably recessed as indicated at 19 in rabbeted formation, to accommodate the handle and permit the straight edge of the blade to move entirely across the faces between the base and cap when in closed relation.

Also pivoted to the bolt 15 together with the blade of the cutter is a strip 20 constituting a guide having a series of perforations 21 therethrough corresponding in relative position to the relation of the depressions 11 and the resilient projections 14, so that all three will be in alinement when the parts are related as shown in Figs. 2 to 5 inclusive, of the drawings. The strip forming the guide is apertured to receive the bolt 15, and the end thereof is likewise rounded similar to the blade 16, in order to permit pivotal movement thereof between the sections constituted by the base 10 and the cap 12, as indicated at 22 whereby the blade and guide may swing between or from between the base and cap in planes parallel thereto and to each other, the blade being adapted to intercept the path of the apertures in the cutting operation. The headed end of the bolt is disposed innermost as indicated at 23 and is provided with a washer 24 thereon, the head and washer being accommodated in a recess 25 in the inner face of the cap 12 so that the parts may move into proper relative positions when the device is in use. The nut 26 is embedded in the outer face of the base 10 and serves as means for adjusting the tension between the hinged parts independently of the hinged connection between the base and the cap.

When the parts are related as shown in Figs. 2 to 5 inclusive of the drawings, the blade and guide being positioned in alinement between the closed sections of the device constituted by the base 10 and the cap 12, they are adapted to be held in this relation, suitable means being provided for the purpose. It should be noted from Fig. 2 of the drawings that the blade is disposed in an inclined position at its back edge, the handle projecting from one end of the body or holder constituted by the base and cap when in assembled relation. Clamping means are provided at the ends of the device to secure the sections in assembled relation, and as shown, these devices are in the form of right angular clamping strips 27 pivoted to the ends of the base 10 as by means of staples 28, the strips being provided with openings or apertures 29 for this purpose and the end portions 30 of the strips being directed at right angles and enlarged in width so as to engage the ends of the sections 10 and 12 and against the outer face of the section 12 forming the cap of the device. By this means, the parts are held closed with sufficient pressure to permit proper clamping action therebetween, but not such as to prevent free movement of the knife or blade when the device is in use.

In the use of the device, the cap and base are opened out and the knife or blade swung to one side on the pivot 15 with the guide or holder 20 disposed in alinement with the base so that the perforations therethrough will aline with the holes or depressions in the base. In the proper use of device, the cutter is held with the handle of the knife toward the operator, holding it in the left hand with the blade toward the left, the clamps being then released from their positions holding the base and cap or top together. The blade is then pulled back until all of the holes are clear, when the seeds can be easily put into the holes or depressions by taking a handful of them and rubbing them into the openings lint and all. The guide is preferably about $\frac{3}{16}$ of a inch thick and the proper width to cover the base, the perforations therein matching the holes or depressions in the base while the perforations serve to receive the seeds and guide them into the base holes or depressions. The perforations are large enough to take care of the largest varieties of seed and the holes or depressions in the base are of such a size and depth to take care of the small seeds as well as the large ones. The cap is then clamped down against the base, the resilient projections or tips thereof extending through and into the perforations 21 of the guide so as to force the seeds in the depressions of the base. By swinging the knife between the base and guide, the seeds will be simultaneously cut in two, it being understood that the seeds are forced into the depressions in the base by means of the projections on the cap or top portion of the body of the device. After the seeds are cut, the cap is raised, the clamping means at the ends being first released. The guide is then swung laterally while maintaining the knife blade in position to cover the seeds retained in the cups or depressions of the base, the blade being sufficiently broad to keep the seeds from being pulled from the base holes by the guide, owing to the fact that there is more or less lint left on the seeds, thereby rendering this a necessary and desirable feature of the invention. The guide having been swung aside, the blade can then be similarly swung from on the base, thus exposing the seeds which have been cut and permitting the convenient examination thereof to determine the grade.

In view of the foregoing it is thought that the operation of the device will be readily understood and in view of the simplicity and practical value that it will commend itself to those skilled in the art.

However, it is to be understood that the device is to be used in cutting the seed after the same have been through the gin. The lint remaining is hardly more than 150 pounds to the ton of cotton seed, it being understood that it is not possible to use the device to cut seed while in the lint or before ginning. Also, the base 10 is provided with a recess at its inner face opposite the pivoted end of the knife to form a shoulder 10' to accommodate the guide or strip 20 and support the latter in position as well as to keep it from obstructing the entry or passage of the knife between the base and guide, which latter is supported at one end by the pivot and at the other end by the shoulder. This provides for a space of about one-sixteenth of an inch thick, or the thickness of the cutting blade, between the guide and the base, so as to prevent the cutter, when the clamp is in place and the cutter is closed, from interfering with the operation of the knife or cause too much friction such as would interfere with the free movemenet of the knife during the cutting operation.

Having thus described my invention, what I claim is:

1. In a cotton seed cutter, a holder provided with a series of depressions, means including a series of projections coöperating therewith for guiding and forcing the seeds into said depressions, and a cutter operated between the same whereby the seeds may be cut simultaneously and the meat thereof exposed.

2. A seed cutter of the class described comprising a holder consisting of a base section and a cap section movably connected thereto, said base being provided with cups and the cap section having resilient projections and disposed for alinement with the cups, means for holding said base and cap in closed relation, a guide interposed between the base and cap and having perforations therein adapted to aline with the cups and projections, and a blade movable across the base between the latter and the guide.

3. A seed cutter of the class described comprising a holder consisting of a base section and a cap section movably connected thereto, said base being provided with cups and the cap section having resilient projections and disposed for alinement with the cups, means for holding said base and cap in closed relation, a guide interposed between the base and cap and having perforations therein adapted to aline with the cups and projections, a blade movable across the base between the latter and the guide, said guide and blade being hinged to the base for disposition between the latter and the cap, and a handle on the blade extending outwardly of and beyond one end of the base.

4. A cutter of the class described comprising the combination with a base having a series of rows of semi-circular depressions therein and a top member having a series of resilient projections arranged in rows to aline with the depressions of the base; of means for guiding the seeds into the depressions and holding the projections from extending thereinto, and cut or operative between the last named means and the base to move across the face thereof provided with the depressions whereby to cut the seeds therein.

5. A cutter of the class described comprising the combination with a base having a series of rows of semi-circular depressions therein and a top member having a series of resilient projections arranged in rows to aline with the depressions of the base; means whereby said base and top may be moved relatively to open and closed positions, a cutter operative across the base depressions, and means for coöperation with said depressions and projections to hold the seeds, whereby the blade may be moved to cut the same while remaining out of engagement with the projections.

6. The combination with an elongated base having a series of cups for receiving cotton seed or the like, a top hinged thereto for movement toward and away from the same, said top when moved toward the base being exposed in spaced relation with respect thereto, resilient projections on the coöperating face of the top, means to hold said base and top in closed relation detachably, a perforated guide pivoted between the base and top, the perforations thereof alining with the cups and projections whereby the projections will engage seeds in the perforations to hold the cotton seed firmly against the bottom portion of the cups of the base, and a blade pivoted between the guide and base for movement across the latter to cut the seeds held in the cups thereof.

7. A cutter of the class described comprising the combination with a base having a series of rows of semi-circular depressions therein and a top member having a series of resilient projections arranged in rows to aline with the depressions of the base; means to detachably hold said sections in clamping relation, a perforated guide pivoted to the base and disposed for movement into and out of alinement with the base and top, said projections of the top being designed to project into the apertures of the guide to force the seeds therein to the base depressions and a knife pivoted to the base together with the guide, for movement between the latter and against the face of the base provided with the depressions to cut the seeds by movement across the base.

8. A cotton seed cutter comprising a pair of hinged strips for movement in open positions or toward each other in spaced parallel relation, one face of one of said sections disposed toward the corresponding face of the other projection being provided with holes therein, resilient tips projecting from the corresponding face of the other section to engage said holes and conforming thereto, clamps carried by the ends of one section to engage the ends of the other section and hold the same detachably toward each other, a blade and a guide strip pivoted to one of said sections at its inner face disposed toward the other section on a single pivot member, said blade being designed to extend across the first named section and having a cutting edge of rectilinear formation, said blade having a shank portion extending from the sections, and a handle thereon, and said guide strip having perforations therethrough to aline with said holes and tips for receiving the seed therein, said seed being forced into the holes by means of the tips when the sections are in closed relation, and movement of the blade between the guide and the section provided with the holes serving to cut the seed held therein.

WILLIAM RICHMOND PINCKNEY.